United States Patent
Doerr (10) Patent No.: US 12,182,312 B1
(45) Date of Patent: Dec. 31, 2024

(54) TECHNIQUES TO SUPPORT TIERED SECURITY ZONES FOR WEB-BASED APPLICATIONS

(71) Applicant: Here Enterprise Inc., New York, NY (US)

(72) Inventor: Chuck Doerr, New York, NY (US)

(73) Assignee: Here Enterprise Inc., New York, NY (US)

( * ) Notice: Subject to any disclaimer, the term of this patent is extended or adjusted under 35 U.S.C. 154(b) by 0 days.

(21) Appl. No.: 18/776,878

(22) Filed: Jul. 18, 2024

(51) Int. Cl.
  *G06F 21/00* (2013.01)
  *G06F 21/55* (2013.01)
  *G06F 21/62* (2013.01)

(52) U.S. Cl.
  CPC .......... *G06F 21/6263* (2013.01); *G06F 21/55* (2013.01)

(58) Field of Classification Search
  CPC .............................. G06F 21/6263; G06F 21/55
  See application file for complete search history.

(56) References Cited

U.S. PATENT DOCUMENTS

2016/0253670 A1\* 9/2016 Kim ................. G06Q 20/38215
  705/72

\* cited by examiner

*Primary Examiner* — Ghazal B Shehni
(74) *Attorney, Agent, or Firm* — Womble Bond Dickinson (US) LLP (57) ABSTRACT

First data from a first application logically located in a first security zone may be identified. A processing device may determine a second application is logically located in a second security zone having a higher trust level than the first security zone based on configuration data. The first data may be communicated, via an interoperation bus, to the second application based on the second security zone having the higher trust level.

16 Claims, 7 Drawing Sheets

TECHNIQUES TO SUPPORT TIERED SECURITY ZONES FOR WEB-BASED APPLICATIONS

FIELD OF DISCLOSURE

This disclosure relates generally to data security and sharing, and more particularly to techniques to support tiered security zones for web-based applications.

BACKGROUND

Information security is the practice of protecting information by mitigating information risks. Information security typically involves preventing or reducing the probability of unauthorized or inappropriate access to data or the unlawful use, disclosure, disruption, deletion, corruption, modification, inspection, recording, or devaluation of information. One of the primary focuses of information security is the balanced protection of data confidentiality, integrity, and availability (also known as the "CIA" triad) while maintaining a focus on efficient policy implementation, all without hampering organization productivity. For example, the productivity of an organization can be hampered when data is not readily available to authorized users and, on the other hand, disastrous consequences, such as data breaches, can result when data is accessible by unauthorized users.

Web-based applications, or a web application, may refer to application software that is accessed via the World Wide Web, such as using a web browser application. Security breaches on these kinds of applications are a major concern because it can involve both enterprise information and private customer data. Protecting these assets is an important part of any web application and there are some key operational areas that must be included in the development process. This includes processes for authentication, authorization, asset handling, input, logging, and auditing.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

To easily identify the discussion of any particular element or act, the most significant digit or digits in a reference number refer to the figure number in which that element is first introduced.

DETAILED DESCRIPTION

The following description sets forth numerous specific details such as examples of specific systems, components, methods, and so forth, in order to provide a good understanding of various embodiments of the techniques described herein for supporting tiered security zones, such as for web-based applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Existing security techniques for web-based applications fail to facilitate sharing between different trusted applications in a secure and efficient manner. For example, existing techniques may require a user to manually take output from a first application and manually enter it as input to a second application. This leads to time-consuming and inefficient techniques for data sharing, especially when data needs to be shared with a plurality of applications. In another example, different applications may be specially configured to share data. However, expert knowledge and manually intensive procedures are required to configure and reconfigure which applications are able to share data between themselves. Further, existing techniques utilize a single application (e.g., browser) to access a web-based applications and the open-internet. However, prior to upgrading the application, each of the web-based applications much be recertified to properly operate on the upgraded version. However, such recertifications demand considerable resources and applications utilized to access the open internet require frequent updates.

Adding further complexity, different web-based applications are associated with different levels of trust and have different needs for data security and sharing. However, existing systems are incapable of accommodating the different needs and arrangements for applications associated with different levels of trust. For example, existing systems fail to support directional sharing such that a highly trusted application may have access to data of a less-trusted application without the less-trusted application having access to data of the more-trusted application. In some such scenarios, data sharing between the different applications may be blocked completely. However, while the data may be secure, it is not readily available to authorized consumers, which hampers organization productivity. In other such scenarios, existing systems may facilitate data sharing, but at the cost of security. For example, applications may not be process isolated from other applications, providing unnecessary attack vectors for malicious actors. These limitations can drastically reduce the applicability, usability, and capabilities of security techniques for web-based applications, contributing to rigid and inefficient systems.

Accordingly, many embodiments disclosed hereby provide various techniques and features for supporting tiered security zones for web-based applications. Some embodiments are particularly directed to implementing different security and data sharing policies for each security zone in a manner that maintains appropriate levels of security while facilitating ready access by authorized web-based applications to the data of other applications. For example, each zone may be associated with a level of trust relative to each other zone and applications located in zones with a higher level of trust may be given access to data of applications located in zones with a lower level of trust. Further, applications located in zones with a lower level of trust may be restricted from accessing data of applications located in zones with a higher level of trust. In many embodiments, different permissions, firewalls, content security policies (CSP), and the like may be tailored for each security zone. For example, each zone may utilize a separate stack with different configurations to implement a particular set of permissions, firewall settings, and/or CSP. In several embodiments, each zone and/or application may be fully process and/or cache isolated (e.g., via different versions/configurations of access applications). In several such embodiments, applications may be reconnected, such as for data sharing via an interoperation bus (also referred to as an interop bus), according to various techniques described hereby. In various embodiments, process separation can provide robust security against cross site script attacks. Accordingly, embodiments described hereby provide techniques and features for supporting tiered security zones for web-based applications in an efficient, accurate, and customizable manner that improves the secure availability of data to authorized consumers.

In several embodiments, these techniques and features may be implemented via a server system that implements an application zoning environment with different tiered zones. Further, the different zones may be provided with different configurations, permissions, and access, providing robust and fine-grained control over application security and data sharing. In some embodiments, an interop bus may be utilized to facilitate data sharing between different applications in different zones. For example, the interop bus be utilized to provide an application with access to data from applications in the same zone or any zone associated with a lower level of trust and the application may be restricted from accessing data in the interop bus from applications in any zone associated with a higher level of trust. In many embodiments, these techniques and features, such as process isolation, may be utilized to improve system upgrades, such as via finer-grained control over upgrades that enable separate zones and/or environments to be upgraded separately. For example, an application utilized to access the open-internet can be upgraded without having to recertify that web-based applications in one or more separate security zones will operate properly after the upgrade.

In these and other ways, components/techniques described hereby may provide many technical advantages for supporting tiered security zones for web-based applications. For example, data sharing with authorized entities can be reliably, intuitively, and efficiently implemented. In another example, fine-grained control of security and data access policies for web-based applications can be realized in a scalable, efficient, and secure manner. Further, the techniques and features described hereby provide particular ways of programming or designing software to create tiered security zones that support data sharing between authorized entities. Additionally, the techniques and features provide a specific interface and implementation for navigating and configuring complex interactions with a multitude of resources and applications in a centralized and efficient manner using techniques unique to computers, such as an interop bus and security zones. Therefore, the computer-based techniques of the current disclosure improve the functioning of security techniques for web-based applications, resulting in better performance, improved capabilities, and improved user experiences as compared to conventional approaches. Accordingly, embodiments disclosed hereby can be practically utilized to improve the functioning of a computer and/or to improve a variety of technical fields including data security, data sharing, web-based applications, application upgrades, data busses, and user experience.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
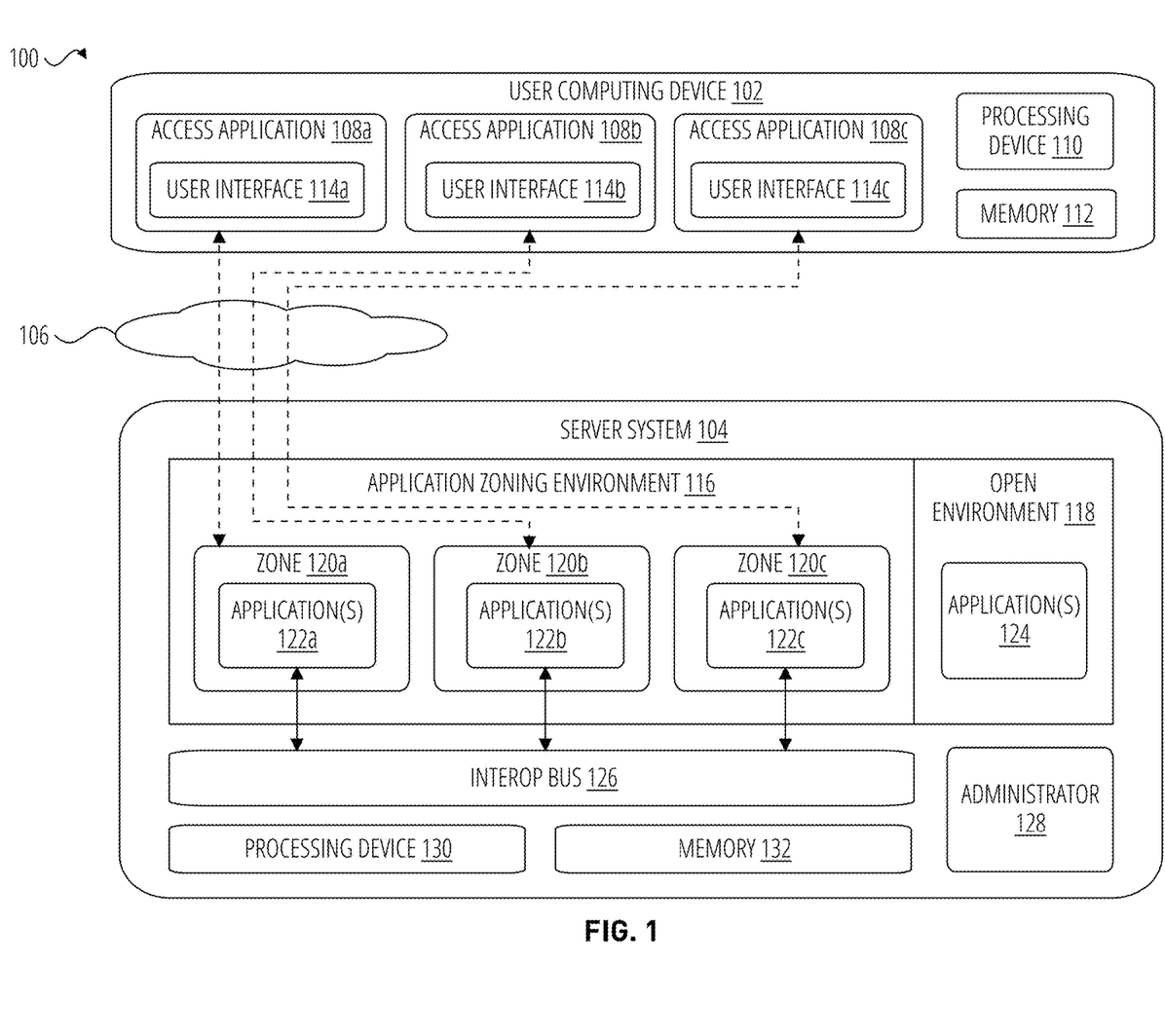
FIG. 1 illustrates an exemplary operating environment for supporting tiered security zones for web-based applications according to some embodiments of the present disclosure.

FIG. 1 illustrates an operating environment 100 for supporting tiered security zones for web-based applications according to some embodiments. Operating environment 100 includes a user computing device 102 communicatively coupled to a server system 104 via a network 106. The user computing device 102 includes access applications 108a, 108b, 108c (collectively referred to as access applications 108), a processing device 110, and a memory 112. The server system 104 includes an application zoning environment 116, an open environment 118, an interop bus 126, an administrator 128, a processing device 130, and a memory 132. The server system 104 may implement one or more process-isolated zones 120a, 120b, 120c (collectively referred to as zones 124) in the application zoning environment 116. As described in more detail below, the flow of information between the different zones and the one or more applications executed therein, such as through interop bus 126, may be controlled in a customizable, secure, and reliable manner. As shown in the illustrated embodiment, each zone may be implemented and/or interacted with via a separate one of access applications 108 (e.g., version/configuration of a browser application). One or more components of FIG. 1 may be the same or similar to one or more other components disclosed hereby. Further, aspects discussed with respect to various components in FIG. 1 may be implemented by one or more other components from one or more other embodiments without departing from the scope of this disclosure. For example, the server system 104 may be implemented by multiple server computing devices with separate processing devices and memories without departing from the scope of this disclosure. In some such examples, one or more of the multiple server computing device may be connected by a network, such as network 106. Embodiments are not limited in this context.

Generally, each of the access applications 108 of the user computing device 102 may be utilized to access at least one web-based application executed by the server system 104. For example, the access application 108a may generate a user interface 114a that enables a user to interact with a variety of applications (e.g., applications 122a) that are logically located in one of security zone 120a. In some embodiments, each of the applications 122 and/or applications 124 may be web-based applications. In several embodiments, the access applications 108 may include at least one browser application. In several such embodiments, the access applications 108 may include a different browser application (e.g., different version/configuration) for each of the security zones 120. In some embodiments, user computing device 102 may include another application for accessing the open-internet and/or applications 124 in open environment 118). In some such embodiments, the application for accessing the open internet may include yet another version/configuration of a browser application. The administrator 128 may configure the one or more zones 124 in the application zoning environment 116 and/or access applications 108 with different permissions, securities, and levels of data sharing via the interop bus 126. Additionally, the administrator 128 may configure the open environment 118 with various permissions and securities, but without sharing via the interop bus 126.

Thus, an application executed within a zone may be subject to the permissions, securities, and levels of data sharing via the interop bus 126. For example, the one or more applications 122*a* in zone 120*a* may be configured with a first data sharing capability via interop bus 126, the one or more applications 122*b* in zone 120*b* may be configured with a second data sharing capability via interop bus 126, the one or more applications 122*c* may be configured with a third data sharing capability via interop bus 126, and the applications 124 of open environment 118 may be configured with no data sharing capability via interop bus 126. In such examples, the first data sharing capability, being associated with a highest level of trust (e.g., zone 120*a*), may support availability of all data from applications 122 via interop bus 126 while the third data sharing capability, being associated with a lowest level of trust (e.g., zone 120*c*), may only support access to application data via interop bus 126 for other applications in zone 120*c*.

In many embodiments, each zone 124 includes an isolated process or set of processes (e.g., process, stack, and/or cache isolated). For example, a multi-runtime capability may be utilized for isolation. Accordingly, each zone 124 may include a separate runtime. In some such embodiments, each runtime may be implemented via a different access application. One or more applications may be executed in each zone 124 and each zone 124 may be configured with different permissions, securities, and levels of data sharing via the interop bus 126. For example, permissions associated with downloading, upload, printing, copying, pasting, extensions, plug-ins, read access, read/write access, and the like may be individually controlled for each zone and/or environment. In other words, each zone and/or environment can be fully isolated and then rules and configurations may be created to control where information can flow. In one embodiment, the first zone 124*a* may isolate internal applications that are fully trusted and controlled, the second zone 124*b* may isolate a group of applications that are not fully trusted and have a similar trust profile, the third zone 124*c* may isolate a group of applications that are less trusted than the second zone 208*b*, and the open-internet environment 122 may isolate non-working browsing in a locked-down evergreen browser.

In some embodiments, the user computing device 102 may be associated with a security zone. In various such embodiments, one or more features or components of the user computing device 102 may be accessible based on the security zone associated with the user computing device 102. For example, permission to utilize a peripheral of the user computing device 102 (e.g., a printer) may be based on the security zone of the user computing device 102 and the security zone of the requesting use of the peripheral.

In some embodiments, application zoning environment 116 and open environment 118 may be separately configured and/or each of the zones 124 may be separately configured. For example, files downloaded via an application in zone 120*c* may be quarantined and/or scanned, while files downloaded via an application in zone 120*a* may not be quarantined and/or scanned. In one embodiment, the first zone 120*a* may isolate internal applications that are fully trusted and controlled, the second zone 120*b* may isolate a group of applications that are not fully trusted and have a similar trust profile, the third zone 120*c* may isolate a group of applications that are less trusted than the second zone 208*b*, and the open environment 118 may isolate non-working browsing in a locked-down evergreen browser.

Accordingly, the flow of information between the different zones may be controlled, such as by administrator 128. For example, administrator 128 may configure one or more message brokers to control the flow of information between zones via interop bus 126. In some embodiments, each security zone may include a message broker that is responsible for communicating data between zones via the interop bus 126. For example, a message broker for the third zone 208*c* may communicate data from an application in the third zone 208*c* to a message broker for the first zone 208*a* and the message broker for the first zone 208*a* may distribute the data to one or more applications in the first zone 208*a*. In many embodiments, the interop bus 126 may include a logical bus having a network of nodes. For example, the interop bus 126 may include a distributed and/or durable network of nodes that can be configured to communicate with each other. In some such examples, each security zone may be associated with a different node in the network of nodes. In one embodiment, the interop bus 126 may include a WebSocket server.

In one embodiment, each zone may include a full vertical stack (e.g., including separate firewalls and/or CSPs) that are isolated in terms of how they can communicate and share information with each other. For example, each zone may utilize a different version or configuration of a browser application that is set up to implement the target permissions, securities, and data sharing for the corresponding zone. This isolation and configuring may largely be hidden from the end user to provide a seamless and intuitive user experience with improved security and information sharing. For example, applications may automatically be launched into a configured security zone and or access application without requiring user input.

The administrator 128 may generally be utilized to implement and configure the permissions, securities, and levels of data sharing available to each of the applications, such as based on configuration data. In several embodiments, the administrator 128 may include an administrator console for setting up and/or controlling the various permissions, securities, and sharing levels. For example, administrators may be able to log into or access the server system 104 via an administrator computing device to create, manage, or modify permissions, securities, and/or levels of access. In some embodiments, application programming interfaces (APIs) may be utilized to interact with and/or configure administrator 128. Further, auditing and/or logging may be controlled separately for different zones and environments, such as by administrator 128. For example, operations, such as file downloads, may be logged for lower trust zones while not being logged for high trust zones.

Further, in various embodiments, GUI elements may be generated on user interface 114*a*, such as by administrator 128, based on various actions of a user. In some embodiments, the GUI elements may enable a user to make exceptions to rules. For example, a GUI element may be utilized to obtain explicit permission from a user to share information (e.g., a client identifier) from a higher trust zone to a lower trust zone. In some such examples, logging may be triggered in response to exceptions to the rules. In some embodiments, only a portion of the zones and/or environments may be accessible by user computing device 102. For example, different user credentials utilized to access the server system 104 may be associated with different levels of access to the server system 104. In one such example, a user computing device may have access to zone 120*b*, zone 120*c*, and open environment 118 without having access to zone 120*a*.

In operating environment 100, the user computing device 102 and server system 104 may be coupled to the network 106 and communicate with one another using any of the standard protocols for the exchange of information, including secure communication protocols. In several embodiments application programming interfaces (APIs) may be utilized for communication between user computing device 102, server system 104, and/or subcomponents thereof. In one embodiment, one or more of the user computing device 102, server system 104, and/or portions of server system 104 may run on a Local Area Network (LAN) and may be incorporated into the same physical or logical system, or different physical or logical systems. Alternatively, one or more of the user computing device 102, server system 104, and/or portions of server system 104 may reside on different LANs, wide area networks, cellular telephone networks, etc. that may be coupled together via the Internet but separated by firewalls, routers, and/or other network devices. In one embodiment, server system 104 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

It should be noted that although a single processing device 110 and a single memory 112 are depicted in the user computing device 102 and a single processing device 130 and a single memory 132 are depicted in the server system 104 for simplicity, other embodiments may include multiple processing devices, storage devices, or devices. The processing devices 110, 130 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing devices 110, 130 may also include one or more special-purpose processing devices such as an application specific integrated circuit (ASIC), a field programmable gate array (FPGA), a digital signal processor (DSP), network processor, or the like. Further details regarding supporting dynamic context sharing will be discussed below.

Figure 2:
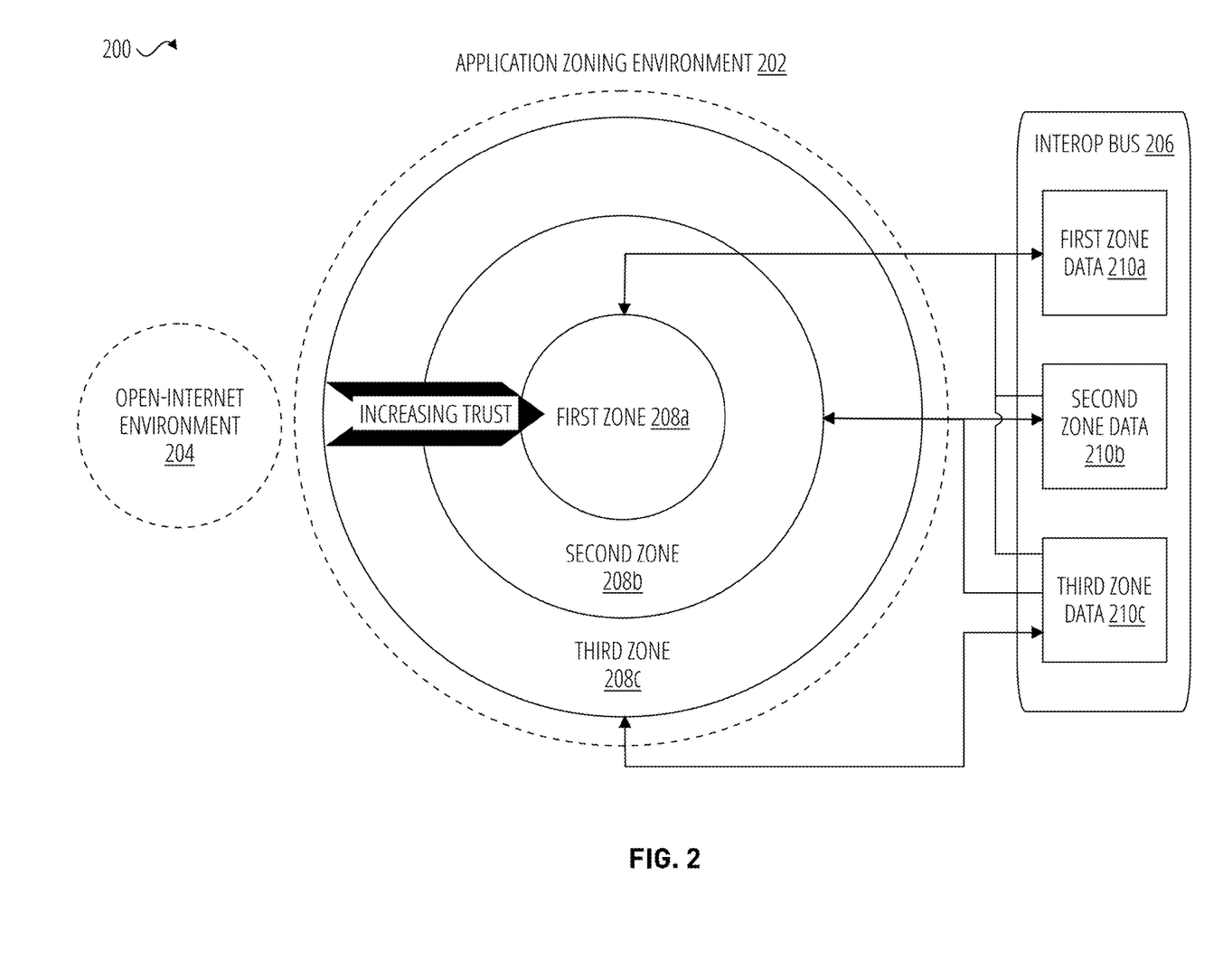
FIG. 2 illustrates an exemplary data sharing schematic for supporting tiered security zones according to some embodiments of the present disclosure.

FIG. 2 illustrates a data sharing schematic 200 for supporting tiered security zones according to some embodiments. The illustrated embodiment includes an application zoning environment 202, an open-internet environment 204, and an interop bus 206. The application zoning environment 202 includes a first zone 208*a*, a second zone 208*b*, and a third zone 208*c* (collectively referred to as zones 208). Further, the level of trust associated with each zone may increase from the third zone 208*c* to the first zone 208*a* and the open-internet environment 204 may be associated with no trust. As described in more detail below, the associated level of trust may dictate the sharing of data via the interop bus 206. One or more components of FIG. 2 may be the same or similar to one or more other components disclosed hereby. For example, application zoning environment 202 and/or interop bus 206 may be the same or similar to application zoning environment 116 and/or interop bus 206, respectively. Further, aspects discussed with respect to various components in FIG. 2 may be implemented by one or more other components from one or more other embodiments without departing from the scope of this disclosure. Embodiments are not limited in this context.

As illustrated in FIG. 2, the applications within the application zoning environment 202 may communicate (e.g., send or receive) data via the interop bus 206, such as to other applications. However, applications within the open-internet environment 204 are not able to communicate data via the interop bus 206. Accordingly, various tiers and environments with different permissions, security, and data sharing may be created and implemented based on the techniques described hereby. In the illustrated embodiment, each zone data corresponds to data from an application or component in an associated zone and communicated via the interop bus 206. For example, first zone data 210*a* corresponds to data from an application or component logically located in the first zone 208*a*. Accordingly, components (e.g., applications and/or computing devices) in the third zone 208*c* may be able to send and/or receive the third zone data 210*c* via the interop bus 206. Components in the second zone 208*b* may be able to send and/or receive the second zone data 210*b* via the interop bus 206. Additionally, components in the second zone 208*b* may be able to receive the third zone data 210*c*. Components in the first zone 208*a* may be able to send and/or receive the first zone data 210*a*. Additionally, components in the first zone 208*a* may be able to receive the second zone data 210*b* and third zone data 210*c*. In many embodiments, the interop bus 206 may comprise a logical bus, such as a durable network of nodes. It will be appreciated that although three different zones are illustrated and described in FIG. 2, more or less zones may be utilized without departing from the scope of this disclosure.

More generally, the level of trust associated with an application may dictate which zone and/or environment an enterprise utilizes to execute the application. For example, applications that are developed by the enterprise and are fully controlled by the enterprise may be executed in the first zone 208*a*. In one such embodiment, the applications in the first zone 208*a* may include an application for accessing an internal database. Applications that are developed by a third party that has some relationship (e.g., contractual controls and/or audit rights) with the enterprise may be executed in the second zone 208*b*. Applications that are developed by a third party that has little or no relationship (e.g., no contractual controls and/or no audit rights) with the enterprise may be executed in the third zone 208*c*. Applications that are developed by unknown parties or developed by third parties and have no relationship (e.g., no controls and/or no rights) with the enterprise may be executed in the open-internet environment 204. In many embodiments, intelligent defaults may be created around the different zones and environments so that developers have to think less about security and more strategically.

Figure 3:
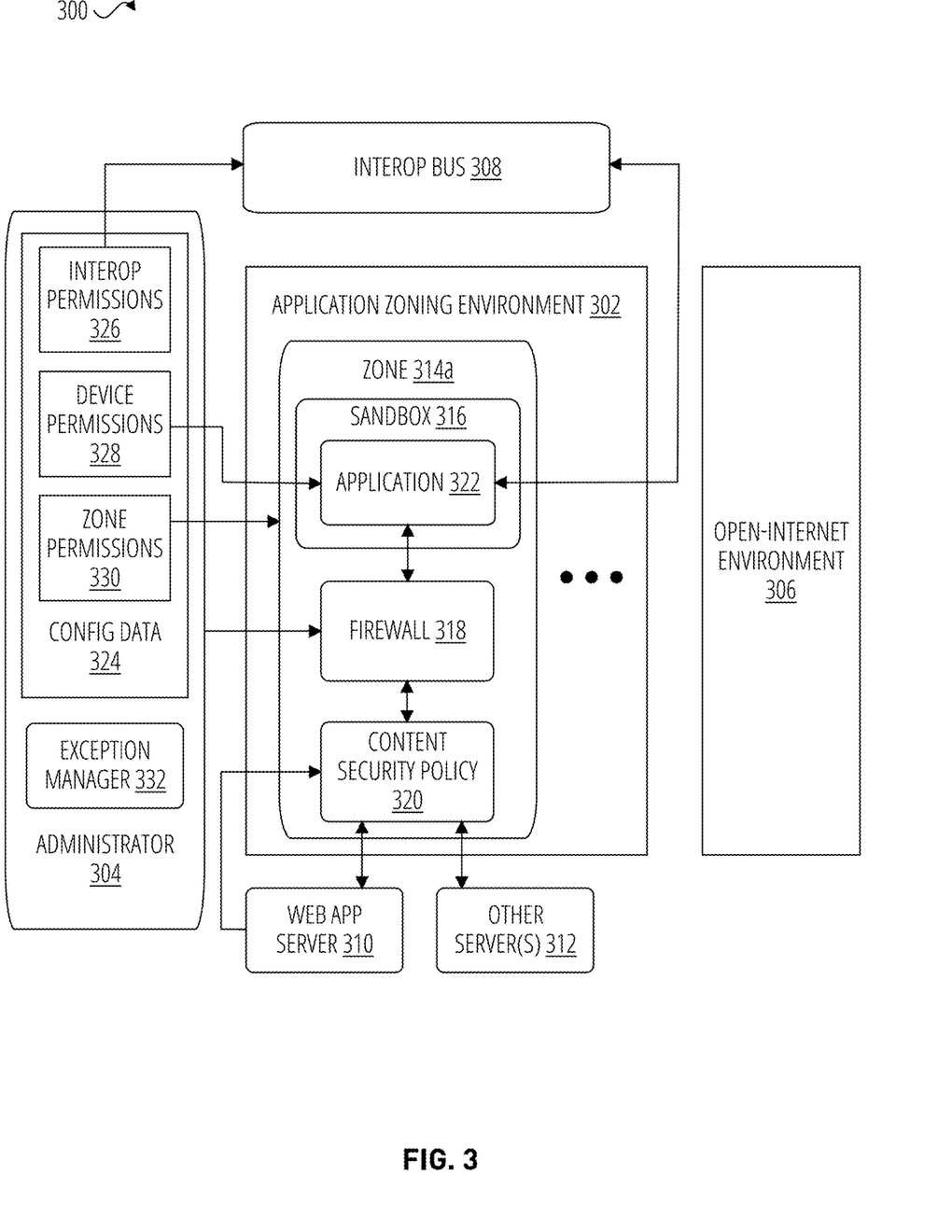
FIG. 3 illustrates an exemplary security architecture schematic for supporting tiered security zones according to some embodiments of the present disclosure.

FIG. 3 illustrates a security architecture schematic 300 for supporting tiered security zones according to some embodiments. The illustrated embodiment includes an application zoning environment 302, an administrator 304, an open-internet environment 306, an interop bus 308, a web app server 310, and one or more other servers 312. As described in more detail below, the administrator 304 may be responsible for configuring security, permissions, and data sharing policies for various zones within the application zoning environment 302. One or more components of FIG. 3 may be the same or similar to one or more other components disclosed hereby. For example, administrator 304 and/or zone 314a may be the same or similar to administrator 128 and/or zone 120a, respectively. In another example, web app server 310 and/or other servers 312 may be the same or similar to one or more portions of server system 104. Further, aspects discussed with respect to various components in FIG. 3 may be implemented by one or more other components from one or more other embodiments without departing from the scope of this disclosure. Embodiments are not limited in this context.

In FIG. 3, the application zoning environment 302 is illustrated with a single zone 314a with a single application 322 for simplicity and clarity of description. However, one or more zones and one or more applications in each zone may be implemented without departing from the scope of this disclosure. In application zoning environment 302, zone 314a includes a sandbox 316 with application 322, a firewall 318, and a content security policy 320. The web app server 310 and one or more other servers 312 are communicatively coupled to the application 322 via the content security policy 320 and the firewall 318. In various embodiments, the web app server 310 may, at least in part, configure the content security policy 320.

The administrator 304 may include config data 324 and an exception manager 332. The config data 324 may generally be utilized by the administrator 304 to implement and control the permissions, security, and data sharing for each environment 302, 306 and/or zone 314a. In many embodiments, the source and destination of data may be controlled based on config data 324. For example, information may freely flow from a lower trust zone to a higher trust zone, but not be able to flow from a higher trust zone to a lower trust zone. In the illustrated embodiment, config data 324 includes interop permissions 326, device permissions 328, and zone permissions 330. The illustrated components of config data 324 are exemplary and variety of other config data 324 components may be utilized. The interop permissions 326 may be utilized to control the flow of information via the interop bus 308. For example, the interop permissions 326 may be utilized to configure one or more message brokers to control the flow of information through the interop bus 308. The device permissions 328 may be utilized to control device specific permissions. For example, the device permissions 328 may indicate a security level associated with the user computing device. In some embodiments, the device permissions 328 may correspond to the login credentials of a user. The zone permissions 330 may be utilized to control zone specific rules, such as the ability to copy and paste, download files, upload files, when logging is active, when explicit permission is required, etc. For example, communication of data from a first application in a first zone to a second application in a second zone may be blocked in response to an attempted copy and paste operation due to the first zone being associated with a higher trust level than the second zone. Conversely, communication of data from a first application in a first zone to a second application in a second zone may be allowed in response to a copy and paste operation due to the first zone being associated with a lower trust level than the second zone. Thus, communication of the data from the first application in the first zone to the second application in the second zone may be in support of a copy and paste operation.

The exception manager 332 may operate to obtain explicit permission for exceptions to one or more rules. For example, exception manager 332 may cause a GUI element to be presented to a user that requires the user to explicitly approve an action that is contrary to the default rules or explicit approval may form a portion of a rule. In some embodiments, the exception manager 332 may trigger logging of actions that are taken pursuant an exception. In some embodiments, the exception manager 332 may display reasons for blocking actions. For example, if copying is not allowed in a zone and a user attempts to copy information from an application in the zone, a notification that copying is not allowed in this zone may be presented to the user. In another example, if pasting is not allowed in a zone and a user attempts to paste information to an application in the zone, a notification that copying is not allowed in this zone may be presented to the user. In yet another example, if copying from a first zone and pasting in a second zone is not allowed (e.g., because the first zone has a higher trust level than the second zone), a notification that copying from the first zone and pasting to the second zone is not allowed may be presented to the user. A variety of different implementations of rules for different zones and/or environments may be utilized without departing from the scope of this disclosure. For example, a user may be able to copy from an application in a third zone and paste to an application in a first zone, but not be able to copy information from an application in the third zone and past to an application in a second zone. In another example, file uploads may be allowed in the first zone, file uploads with explicit approval may be allowed in the second zone, file uploads with explicit approval and logging may be allowed in the third zone, and no file uploads may be allowed in the open-internet environment.

Figure 4:
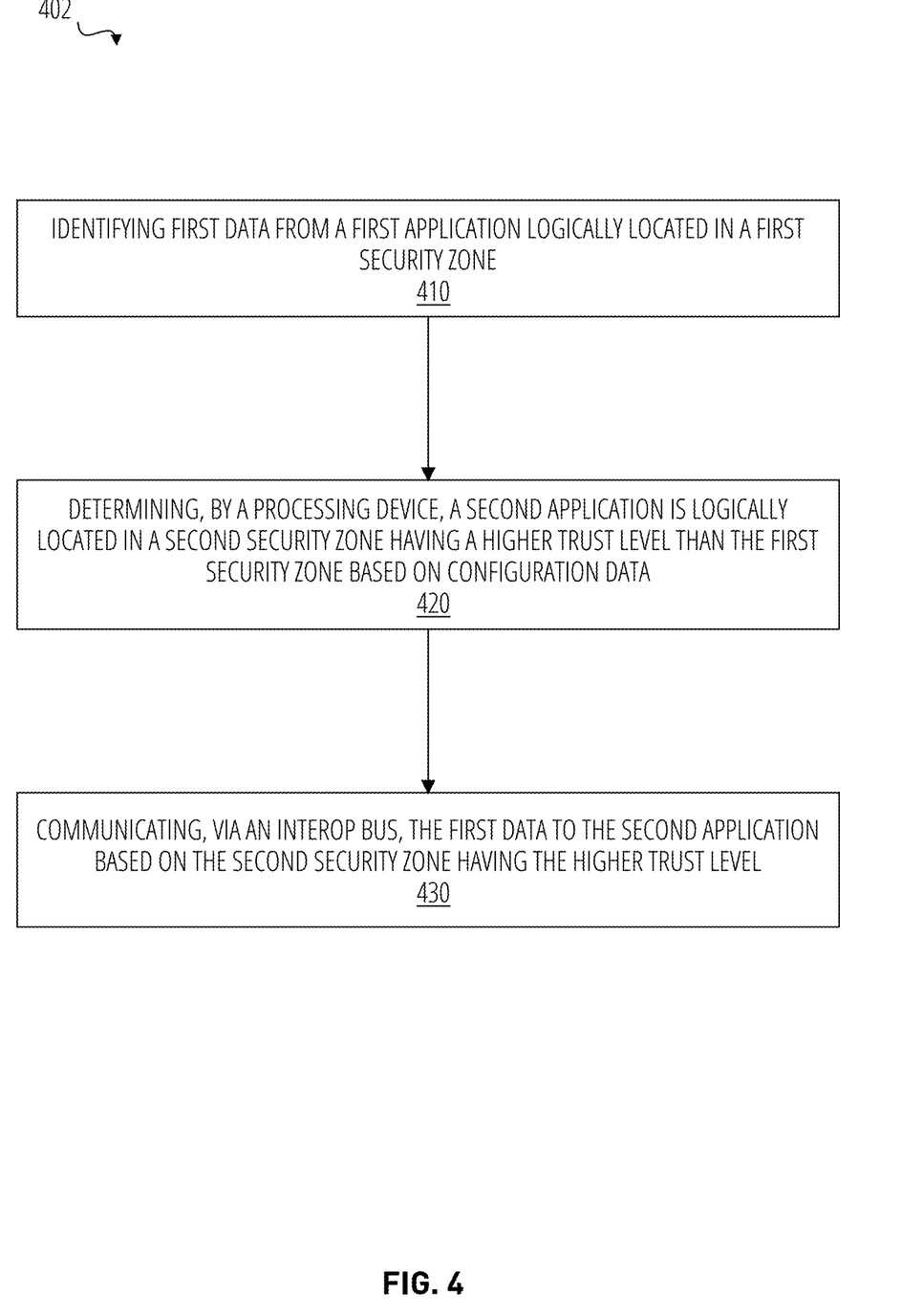
FIG. 4 illustrates a flow diagram of a method for supporting tiered security zones according to some embodiments of the present disclosure.

FIG. 4 is a flow diagram of a method 402 for supporting tiered security zones for web-based applications according to some embodiments. Method 402 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 402 may be performed through the execution of administrator 128 and/or interop bus 126 by processing device 130 of FIG. 1.

With reference to FIG. 4, method 402 illustrates example functions used by various embodiments. Although specific function blocks ("blocks") are disclosed in method 402, such blocks are examples. That is, embodiments are well suited to performing various other blocks or variations of the blocks recited in method 402. It is appreciated that the blocks in method 402 may be performed in an order different than presented, and that not all of the blocks in method 402 may be performed.

Method 402 begins at block 410, where the processing logic identifies first data from a first application logically located in a first security zone. For example, a first application logically located in zone 120c may be identified by processing device 130. Continuing to block 420, the processing logic may determine a second application is logically located in a second security zone having a higher trust level than the first security zone based on configuration data. For example, a second application logically located in zone 120b having a higher trust level than zone 120c may be identified based on configuration data (e.g., config data 324) by processing device 130.

Proceeding to block 430, the processing logic may communicate, via an interop bus, the first data to the second application based on the second security zone having the higher trust level. For example, the first data may be communicated to the second application in zone 120*b* based on the zone 120*b* having a higher trust level than zone 120*c*. In some embodiment, the communication may be performed, at least in part, by a message broker in zone 120*c* and/or zone 120*b*. In various embodiment, the first data may additionally be communicated to one or more applications in zone 120*c* based on the first application and the one or more application each being logically located in zone 120*c*.

Figure 5:
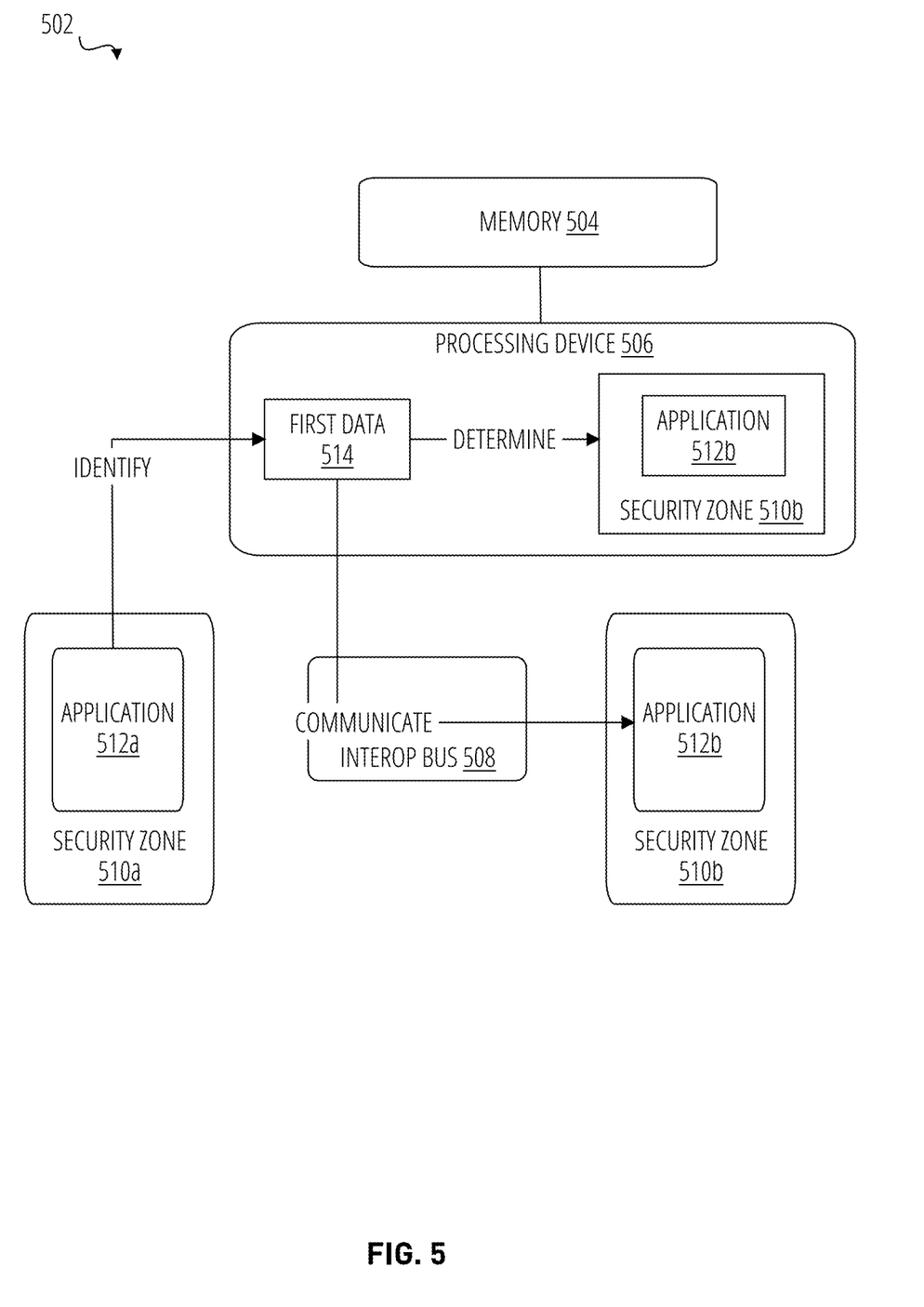
FIG. 5 illustrates a block diagram of an example system for supporting tiered security zones according to some embodiments of the present disclosure.

FIG. 5 illustrates a block diagram of a system 502 for supporting tiered security zones according to some embodiments. In the illustrated embodiment, system 502 includes a memory 504, a processing device 506, an interop bus 508, a first security zone 510*a* with a first application 512*a*, and a second security zone 510*b* with a second application 512*b*. It should be noted that some components of system 502 are shown for illustrative purposes only and are not physical components of the system 502, such as interop bus 508, security zone 510*a*, security zone 510*b*, and first data 514. One or more components of FIG. 5 may be the same or similar to one or more other components disclosed hereby. For example, processing device 506 may be the same or similar to processing device 130. In another example, security zone 510*a*, security zone 510*b*, and/or interop bus 508 may be the same or similar to zone 120*a*, zone 120*b*, and/or interop bus 126, respectively. Further, aspects discussed with respect to various components in FIG. 5 may be implemented by one or more other components from one or more other embodiments without departing from the scope of this disclosure. Embodiments are not limited in this context.

In system 502, the processing device 506 may identify first data 514 from application 512*a* logically located in security zone 510*a*, such as based on one or more user interactions with application 512*a*. For example, the first data 514 from application 512*a* may be identified based on performance of a copy operation. The processing device 506 may determine application 512*b* is logically located in security zone 510*b* having a higher trust level than the security zone 510*a* based on configuration data, such as config data 324. Further, the processing device 506 may communicate, via interop bus 508, the first data 514 to the application 512*b* based on the security zone 510*b* having a higher trust level than security zone 510*a*.

In an alternative embodiment, the processing device 506 may determine application 512*b* is logically located in security zone 510*b* having a lower trust level than the security zone 510*a* based on configuration data, such as config data 324. In response to determining security zone 510*b* has a lower trust level than security zone 510*a*, the processing device 506 may seek explicit permission for communicating the first data 514 to the application 512*a*, such as via a user interface element presented on user computing device 102 by exception manager 332. If explicit permission is obtained, the first data 514 may be communicated to the application 512*b*. In one such embodiment, logging may be triggered in response to receiving explicit permission for communicating the first data 514 to application 512*b*. For example, the logging may track where and when the first data 514 is provided to consumers (e.g., application 512*a*).

Figure 6:
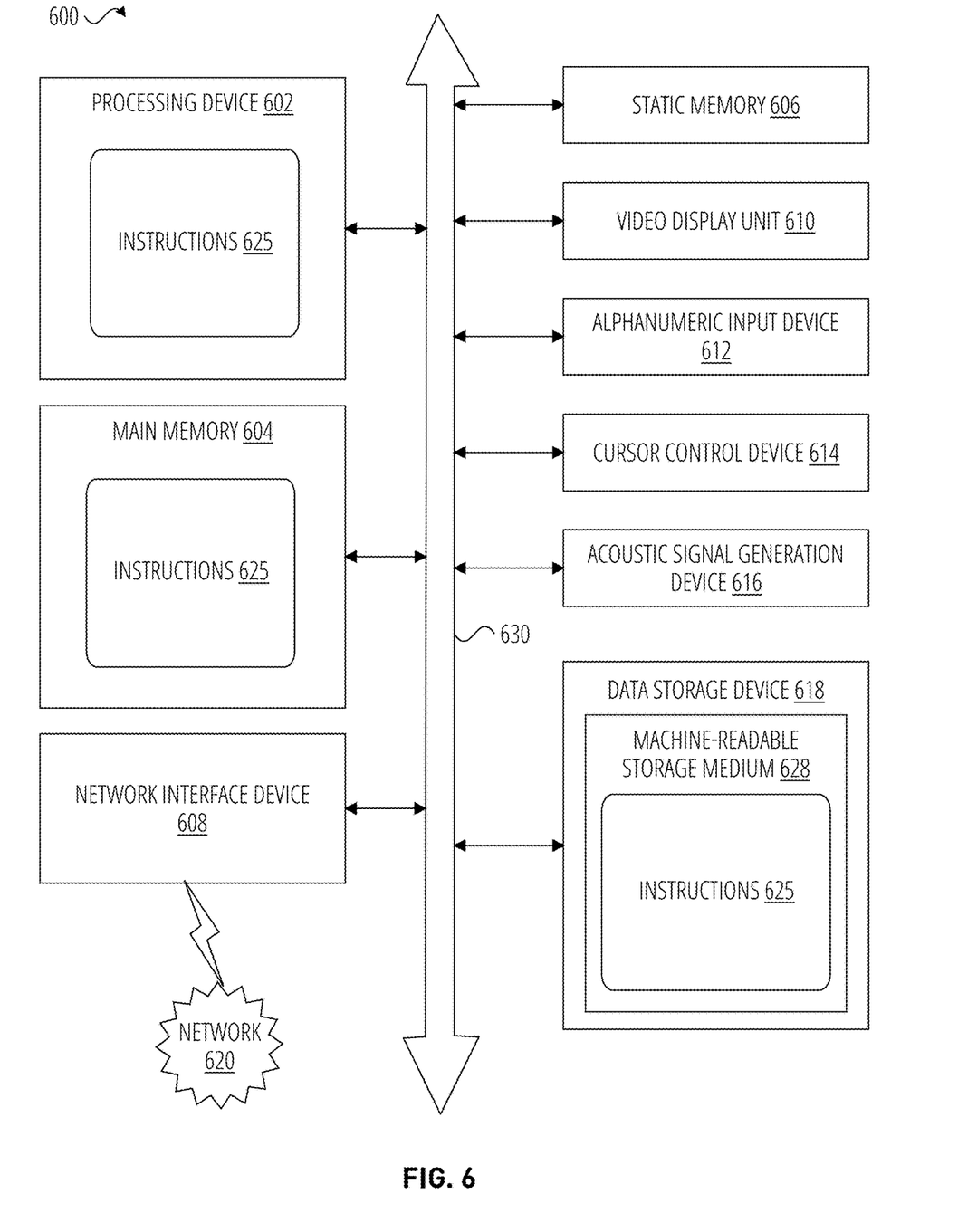
FIG. 6 illustrates a block diagram of an example system according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602 (e.g., a general purpose processor, a PLD, etc.), a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 816 (e.g., a speaker). In one embodiment, video display unit 610, alphanumeric input device 612, and cursor control device 614 may be combined into a single component or device (e.g., an LCD touch screen).

Data storage device 618 may include a machine-readable storage medium 628 on which may be stored one or more sets of instructions 625 that may include instructions for a component (e.g., one or more components of server system 104, administrator 304, and/or interop bus 308) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While machine-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Figure 7:
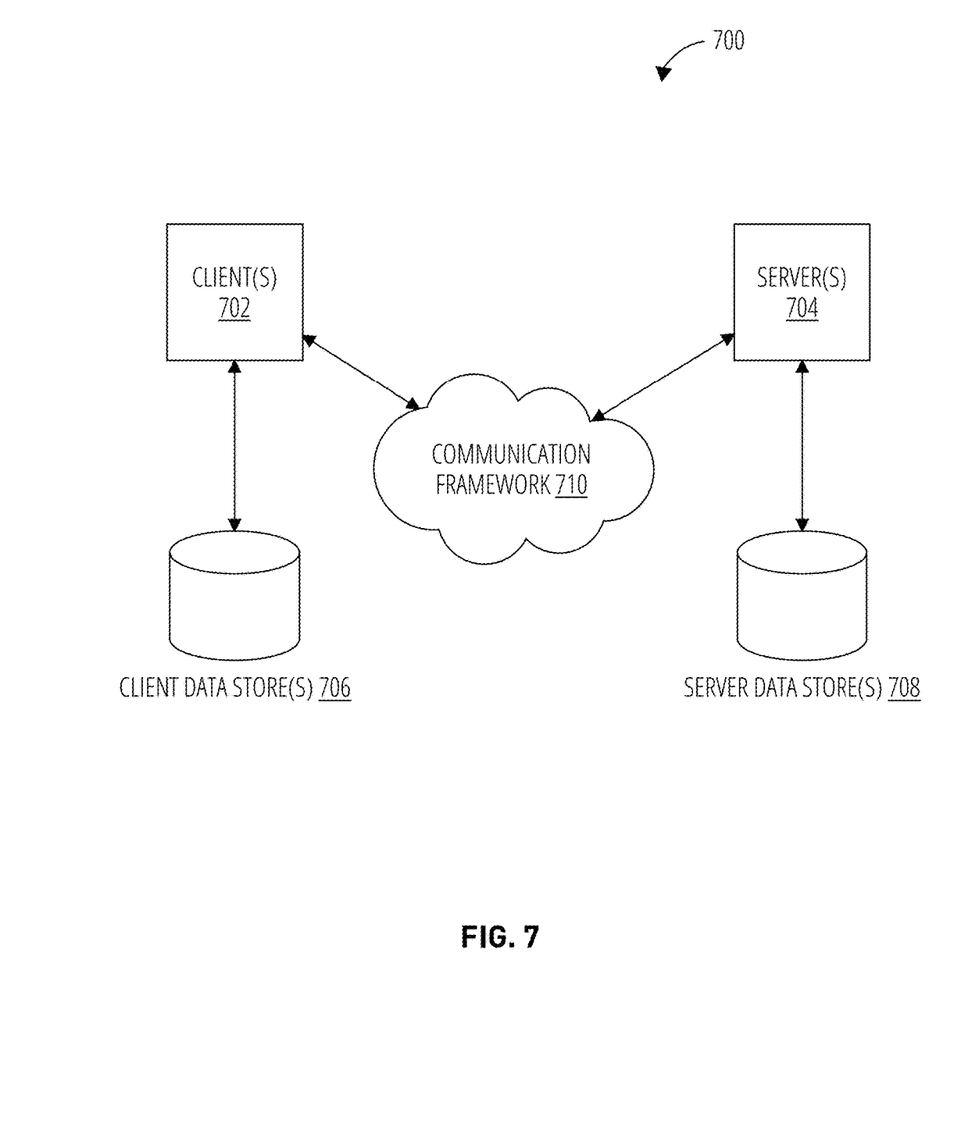
FIG. 7 illustrates exemplary aspects of a communications architecture according to some embodiments of the present disclosure.

FIG. 7 is a block diagram depicting an exemplary communications architecture 700 suitable for implementing various embodiments as previously described, such as communications between user computing device 102 and server system 104, for example. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 includes one or more client(s) 702 and server(s) 704. In some embodiments, each client 702 and/or server 704 may include a computing system (e.g., computing device 600). The server(s) 704 may implement one or more devices or components of server system 104. The client(s) 702 may implement one or more device or components of user computing device 102. The client(s) 702 and the server(s) 704 are operatively connected to one or more respective client data store(s) 706 and server data store(s) 708 that can be employed to store information local to the respective client(s) 702 and server(s) 704, such as cookies and/or associated contextual information. In various embodiments, any one of server(s) 704 may implement one or more logic flows or operations described hereby, such as in conjunction with storage of data received from any one of client(s) 702 on any of server data store(s) 708. In one or more embodiments, one or more of client data store(s) 706 or server data store(s) 708 may include memory accessible to one or more portions of components, applications, and/or techniques described hereby.

The client(s) 702 and the server(s) 704 may communicate information between each other using a communication framework 710. The communication framework 710 may implement any well-known communications techniques and protocols. The communication framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 710 may implement various network interfaces arranged to accept, communicate, and connect to a communications network. A network interface may be regarded as a specialized form of an input/ output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 702 and the server(s) 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other Unless specifically stated otherwise, terms such as "storing," "provisioning," "providing," "restricting", "configuring", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    identifying first data from a first application logically located in a first security zone;
    determining, by a processing device, a second application is logically located in a second security zone having a higher trust level than the first security zone based on configuration data;
    communicating, via an interop bus, the first data to the second application based on the second security zone having the higher trust level;
    identifying second data from the first application logically located in the first security zone;
    determining, based on the configuration data, a third application is logically located in a third security zone having a lower trust level than the first security zone; and
    blocking communication of the second data to the third application based on the third security zone having the lower trust level, wherein communication of the second data to the third application is blocked based on an attempted copy and paste operation from the first application to the third application.

2. The method of claim 1, further comprising:
    determining a third application is logically located in the first security zone based on the configuration data; and
    communicating, via the interop bus, the first data to the third application based on each of the third application and the first application being logically located in the first security zone.

3. The method of claim 1, wherein the interop bus comprises a logical bus having a network of nodes including a first node associated with the first security zone and a second node associated with the second security zone.

4. The method of claim 1, wherein the first application comprises a first web-based application and the second application comprises a second web-based application.

5. The method of claim 1, wherein the first data is communicated to the second application in support of a copy and paste operation from the first application to the second application.

6. The method of claim 1, wherein the first application and the second application are at least one of process isolated or cache isolated.

7. A system comprising: a memory; and a processing device, operatively coupled to the memory, to:
    identify first data from a first application logically located in a first security zone;
    determine a second application is logically located in a second security zone having a higher trust level than the first security zone based on configuration data;
    communicate, via an interop bus, the first data to the second application based on the second security zone having the higher trust level;
    identify second data from the first application logically located in the first security zone;
    determine, based on the configuration data, a third application is logically located in a third security zone having a lower trust level than the first security zone; and
    block communication of the second data to the third application based on the third security zone having the lower trust level, wherein communication of the second data to the third application is blocked based on an attempted copy and paste operation from the first application to the third application.

8. The system of claim 7, wherein the processing device is further to:
    determine a third application is logically located in the first security zone based on the configuration data; and
    communicate, via the interop bus, the first data to the third application based on each of the third application and the first application being logically located in the first security zone.

9. The system of claim 7, wherein the interop bus comprises a logical bus having a network of nodes including a first node associated with the first security zone and a second node associated with the second security zone.

10. The system of claim 7, wherein the first application comprises a first web-based application and the second application comprises a second web-based application.

11. The system of claim 7, wherein the first data is communicated to the second application in support of a copy and paste operation from the first application to the second application.

12. The system of claim 7, wherein the first application and the second application are at least one of process isolated or cache isolated.

13. A non-transitory computer-readable storage medium including instructions that, when executed by a processing device, cause the processing device to:
- identify first data from a first application logically located in a first security zone;
- determine a second application is logically located in a second security zone having a higher trust level than the first security zone based on configuration data;
- communicate, via an interop bus, the first data to the second application based on the second security zone having the higher trust level;
- identify second data from the first application logically located in the first security zone;
- determine, based on the configuration data, a third application is logically located in a third security zone having a lower trust level than the first security zone; and
- block communication of the second data to the third application based on the third security zone having the lower trust level, wherein communication of the second data to the third application is blocked based on an attempted copy and paste operation from the first application to the third application.

14. The non-transitory computer-readable storage medium of claim 13, wherein the processing device is further to:
- determine a third application is logically located in the first security zone based on the configuration data; and
- communicate, via the interop bus, the first data to the third application based on each of the third application and the first application being logically located in the first security zone.

15. The non-transitory computer-readable storage medium of claim 13, wherein the interop bus comprises a logical bus having a network of nodes including a first node associated with the first security zone and a second node associated with the second security zone.

16. The non-transitory computer-readable storage medium of claim 13, wherein the first application comprises a first web-based application and the second application comprises a second web-based application.

* * * * *